Dec. 26, 1950　　　　　　J. R. DAY　　　　　　2,535,122
CROP COMMINUTING MACHINE
Filed Nov. 30, 1946　　　　　　　　　　　3 Sheets-Sheet 1
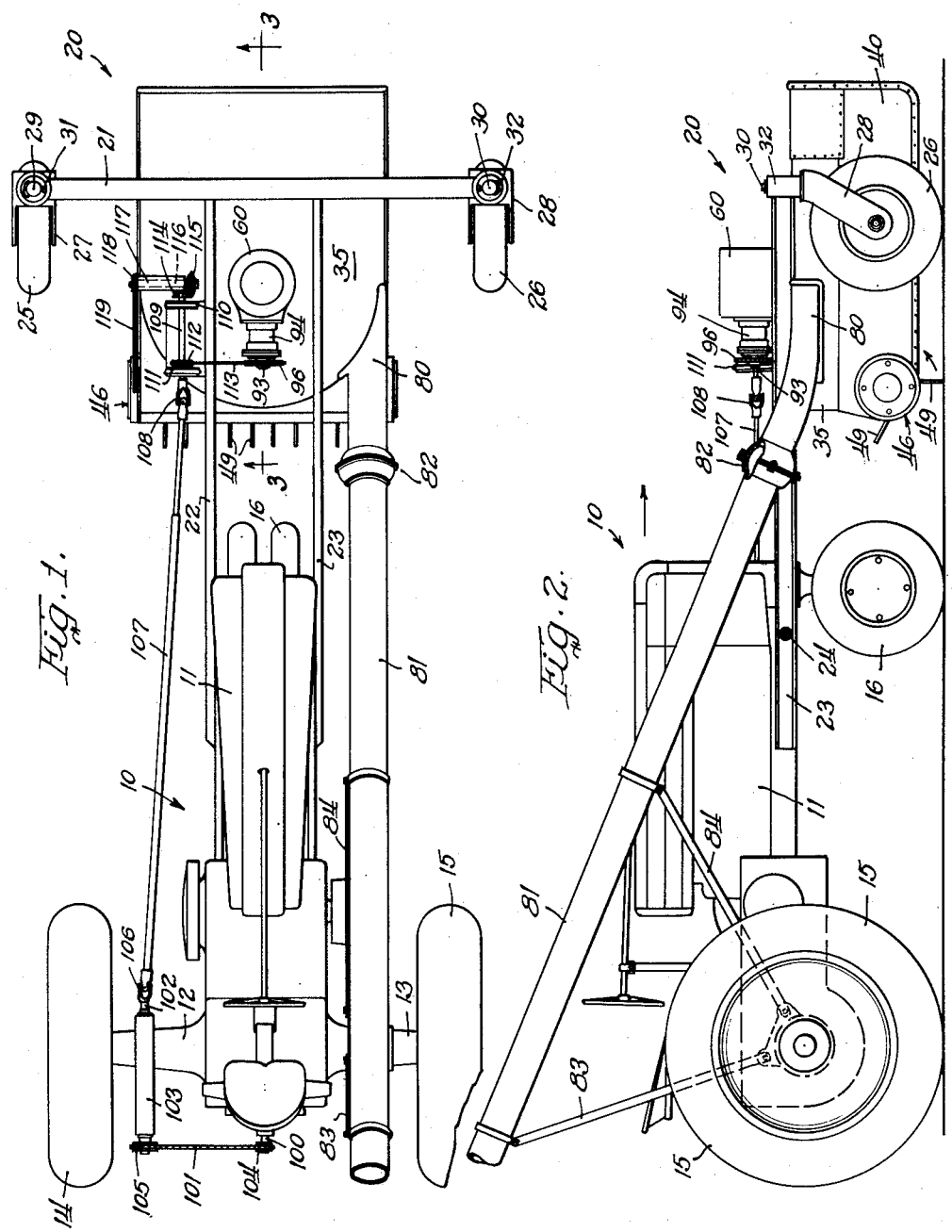
Inventor:
James Russell Day.
By
Atty.

Dec. 26, 1950 J. R. DAY 2,535,122
CROP COMMINUTING MACHINE
Filed Nov. 30, 1946 3 Sheets-Sheet 2
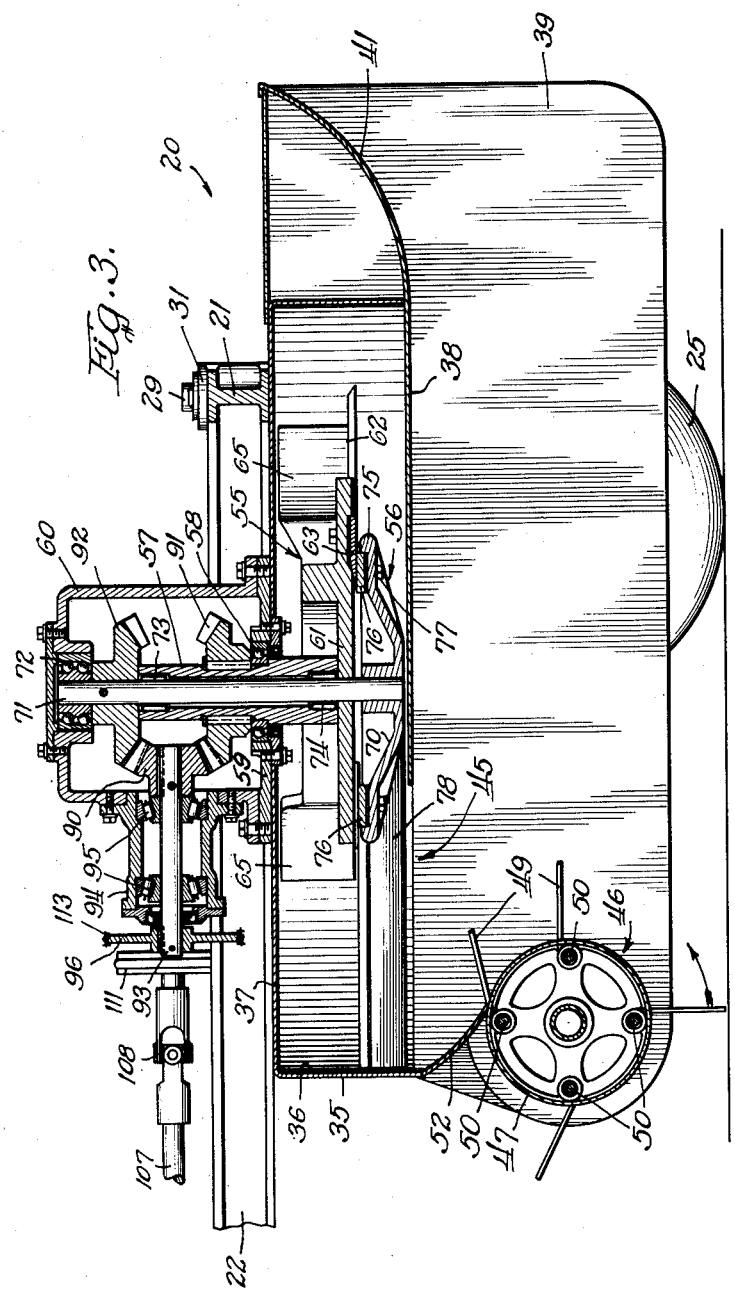
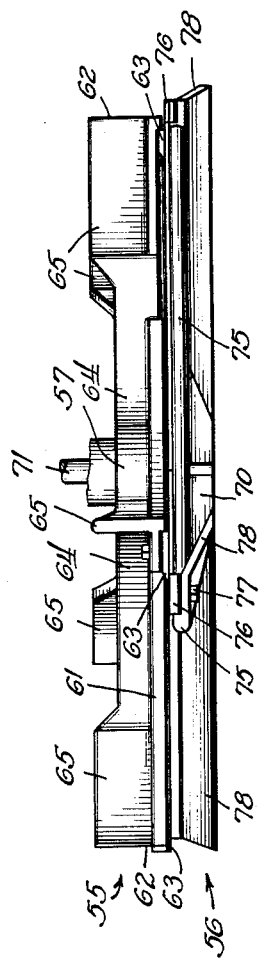

Dec. 26, 1950  J. R. DAY  2,535,122

CROP COMMINUTING MACHINE

Filed Nov. 30, 1946  3 Sheets-Sheet 3

Inventor:
James Russell Day
By

Patented Dec. 26, 1950

2,535,122

UNITED STATES PATENT OFFICE 2,535,122

CROP COMMINUTING MACHINE

James Russell Day, Ottumwa, Iowa, assignor to Deere Manufacturing Co., a corporation of Iowa Application November 30, 1946, Serial No. 713,264

9 Claims. (Cl. 55—118)

The present invention relates generally to crop comminuting machines and more particularly to harvesting machines of the type which pick up a swath or windrow of harvested crops from a field, chop the same into small pieces, and deliver the chopped crops to a wagon or truck disposed behind the harvesting machine.

The principal object of my invention relates to the provision of a novel and improved harvesting machine which is lighter in weight, simpler in construction, and therefore lower in cost, without sacrifice in efficiency or durability. In this accomplishment, I have provided a mobile housing, within which is rotatably disposed a pair of oppositely rotating coaxial rotors adapted to rotate in parallel horizontal planes, with cooperative cutting elements mounted thereon, respectively. The housing is transported over the field in elevated position and is provided with a feed opening in the bottom thereof and a crop pickup device beneath the feed opening for feeding a windrow of crops upwardly into the housing. The lower rotor is provided with feed members which urge the crops upwardly between the oppositely rotating rotors and the crops are comminuted by cooperative action of the cutting elements on the two rotors. The rotors are driven in relatively opposite directions so that a rapid cutting action can be obtained without driving either rotor at excessive speeds. The upper rotor is provided with crop propelling blades by means of which the comminuted crops are discharged through a conduit, which conducts them to the wagon or truck.

These and other objects and advantages of my invention will be apparent to those skilled in the art after a consideration of the following description, in which reference is had to the drawings appended hereto, in which Figure 1 is a top plan view of a tractor and a semi-mounted harvesting machine embodying the principles of the present invention;

Figure 2 is a side elevational view of the tractor and harvesting machine;

Figure 3 is a sectional elevational view, taken along a line 3—3 in Figure 1 and drawn to an enlarged scale;

Figure 6 is a side view of the two rotors in operating position.

Figure 4:
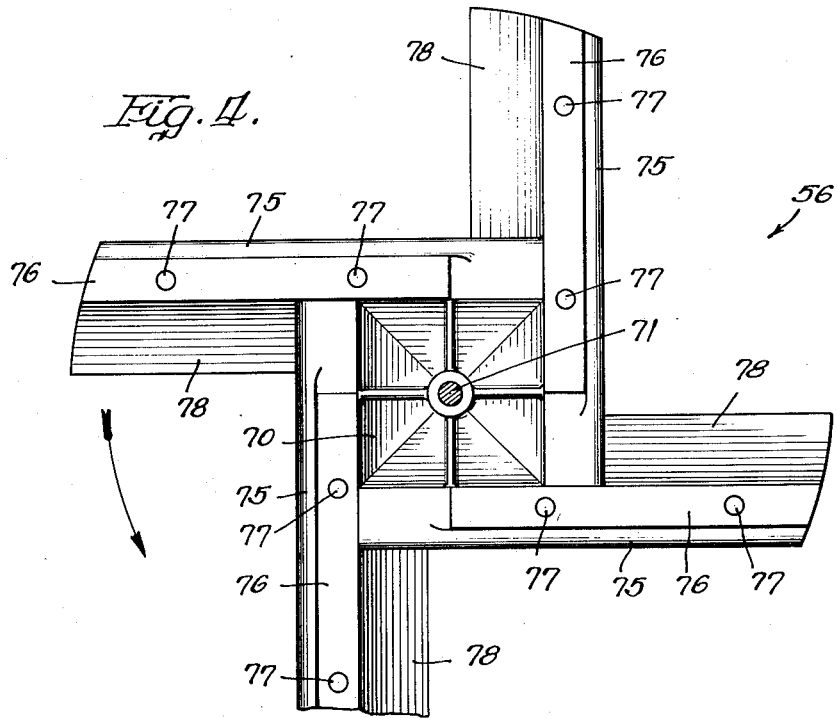
Figure 4 is a top plan view of the lower rotor of the comminuting mechanism.

Referring now to the drawings, wherein Figures 1 and 2 are drawn to the same scale and Figures 3 to 6 are drawn to a scale substantially thrice that of Figures 1 and 2, the reference numeral 10 indicates a tractor of the tricycle type which comprises a longitudinally extending body 11 having a pair of laterally opposite extending rear axle housings 12, 13, on which are mounted a pair of rear traction wheels 14, 15, respectively. The forward end of the tractor body 11 is carried on a dual-wheeled dirigible truck 16 of conventional type.

The harvesting machine is indicated in its entirety by reference numeral 20 and includes a rigid frame comprising a transversely disposed structural axle member 21 and a pair of laterally spaced longitudinally extending frame beams 22, 23, which lie along opposite sides of the tractor body 11, respectively, and are pivotally connected thereto by coaxial bolts 24, thereby providing for vertical swinging movement of the frame members about the transverse axis of the bolts 24, but the beams 22, 23 bear against the opposite sides of the body 11 to provide for steering the harvesting machine by guiding the tractor by means of the dirigible wheels 16.

The ends of the axle 21 are carried on castering wheels 25, 26, respectively, which are carried in castering forks 27, 28, having vertical spindle portions 29, 30 journaled in bearings 31, 32, which are rigidly fixed, as by welding, to the ends of the axle 21. Thus, when the tractor is guided in the field, the frame supporting wheels 25, 26 are free to follow the movement of the tractor.

A crop treating housing 35 is mounted beneath the frame members 22, 23 and axle 21, and comprises a generally cylindrical chamber 36 having top and bottom walls 37, 38 and a pair of depending side walls 39, 40, which extend below the bottom wall 38 on laterally opposite sides, respectively. The bottom wall 38 curves upwardly at its forward end to form a rounded throat portion 41, which, with the depending side walls 39, 40 forms a passage or tunnel to receive the windrow of crops as the machine travels forwardly in the field. The bottom wall 38 of the chamber 36, which is also the top of the crop receiving passage, is provided with a transverse feed opening 45 at its rear end.

A rotary pickup device 46 is mounted beneath the feed opening 45 and serves to pick up the harvested crops and feed them upwardly to the feed opening. The pickup device 46 can be of any suitable or conventional design, but is preferably of the type disclosed in Patent 2,347,907, granted to Hill, May 2, 1944. Briefly, this type of pickup mechanism comprises a cylindrical drum 47 having a series of circumferentially extending slots, through which project crop engageable fingers 49. The fingers 49 are supported on a plurality of rods 50 within the drum 47 and the rods 50 are journaled to permit the fingers 49 to swing between a radially extending position and a tangentially extending position. A scraper blade 52 extends downwardly and forwardly from the rear wall of the housing 35 and has its lower forward edge disposed in scraping relation with the surface of the cylindrical drum 47 and suitably slotted to receive the fingers 49. Camming means (not shown) is provided at one end of the drum for controlling the feathering fingers 49 in a manner well known to those skilled in the art, and which is described in detail in the above identified Hill patent.

Referring now more particularly to Figures 3 to 6, the crops which are fed upwardly through the feed opening 45 into the chamber 36 are comminuted by means of a pair of coaxially disposed upper and lower rotary cutters 55, 56.

The upper rotor 55 comprises a tubular supporting shaft 57, which is disposed for rotation about a generally vertical axis and extends upwardly through an opening in the top wall 37 of the housing 35 and is carried in a ball bearing 58, which is supported in the bottom plate 59 of a gear box 60. The gear box 60 is rigidly mounted on top of the housing 35. The rotor 55 also includes a generally horizontally disposed plate 61, rigidly fixed to the tubular shaft 57 and having a plurality of arms 62, preferably five, on the bottom sides of which are fixed, as by bolting, a plurality of cutting elements 63 in the form of knife blades. Each arm 62 is provided with a vertically disposed flange or web 64, which is rigidly fixed at its inner end to the tubular shaft 57 and extends outwardly behind the cutting element 63 on top of the plate 62, the outer end of the flange 64 being turned away from the cutting element 63 in trailing relation, as indicated at 65.

The lower rotor 56 comprises a body portion or plate 70 mounted on a generally vertical supporting shaft 71 which extends upwardly through the hollow shaft 57 in coaxial relation thereto. The upper end of the shaft 71 is carried in a ball bearing 72 which is mounted on the top of the gear housing 60, and the two coaxial shafts 57, 71 are maintained in coaxial relation by suitable bearings 73, 74, at opposite ends of the tubular shaft 57, respectively.

Figure 5:
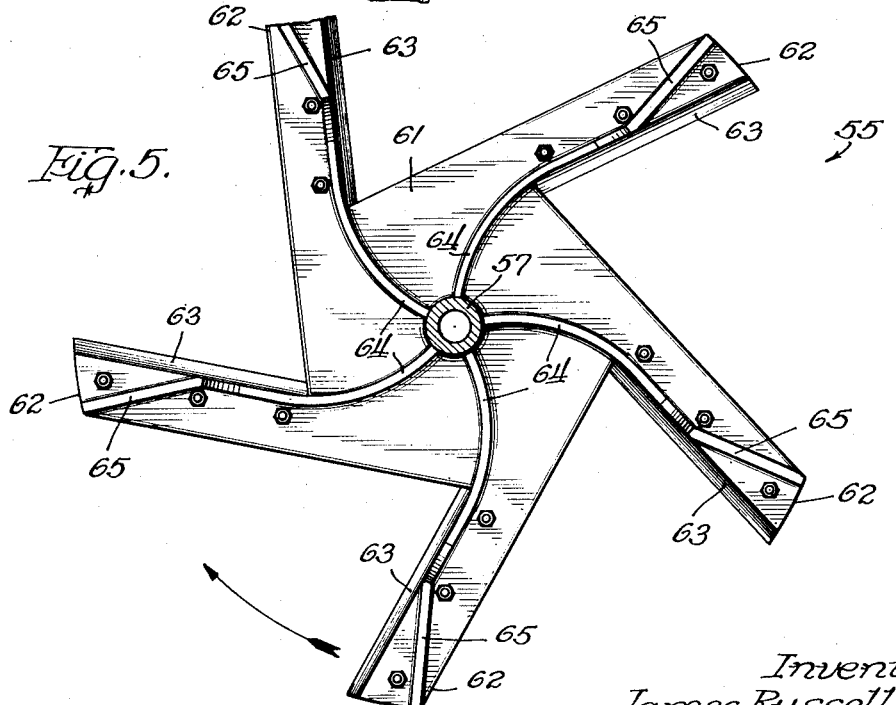
Figure 5 is a top plan view of the upper rotor.

The body 70 of the lower rotor 56 is formed with a plurality of arms 75, preferably four, each of which carries a cutting element 76 on its top side, in the form of a cutter bar which cooperates with the cutting element 63 on the upper rotor 55, when the two rotors 55, 56 are rotated in relatively opposite directions, as indicated by the arrows in Figures 4 and 5. Each of the cutter bars 76 is secured to the respective arm by means of bolts 77 and each of the arms 75 is provided with a crop deflecting plate 78, which is inclined downwardly and forwardly in a leading direction from the cutter bar 76 and has a lower edge which moves in close proximity to the bottom plate 38 of the housing 35. The crop deflecting plates 78 engage the crops which are being fed upwardly through the feed opening 45 and urge the crops upwardly into cutting position between the planes of the cutting elements 63, 76.

The chopped crops are propelled out of the housing 35 through a tubular tangentially disposed discharge duct 80, which extends rearwardly and upwardly from a discharge opening in the cylindrical wall of the housing. The crops are propelled tangentially through the duct 80 by means of the vertical flanges 64 and 65 which serve as impellers. A discharge pipe 81 is connected to the duct 80 through a flexible joint 82 and extends upwardly and rearwardly therefrom over one of the tractor axle housings 13 to conduct the chopped crops to a suitable wagon or truck (not shown) behind the tractor. The pipe 81 is carried on suitable brackets 83, 84, which are supported on the axle housing 13.

The rotors 55, 56 are driven in relatively opposite directions by means of a bevel pinion 90 which meshes with a pair of bevel gears 91, 92 mounted on the shafts 57, 71 of the two rotors 55, 56, respectively. The pinion 90 is fixed to a shaft 93, which extends rearwardly from the gear box 60 to an extension housing 94, within which is disposed a pair of axially spaced roller bearings 95 for supporting the shaft 93. A sprocket 96 is fixed to the rear end of the shaft 93 outside the housing extension 94.

Power for driving the two rotors 55, 56 is obtained from the power takeoff shaft 100 of the tractor, which extends rearwardly from the rear axle housing in the conventional manner. The power takeoff shaft 100 is connected by means of a power transmitting chain 101 with a power shaft 102 which is supported in a sleeve 103 on the axle housing 12. The chain 101 is trained over a pair of sprockets 104, 105 on the power takeoff shaft 100 and the power shaft 102, respectively. The shaft 102 is connected through a universal joint 106 with an extensible shaft section 107 comprising a pair of telescoping elements, the section 107 being connected through a second universal joint 108 with a shaft 109 that is journaled in a pair of fore and aft spaced bearings 10, 111 on top of the housing 35. The shaft 109 carries a sprocket 112 which is connected to drive the sprocket 96 through a power transmitting chain 113. A bevel pinion 114 is mounted on the forward end of the shaft 109 and meshes with a bevel gear 115 carried on a transverse shaft 116, which is journaled in a bearing block 117 on top of the housing 35. The outer end of the shaft 116 carries a sprocket 118, which is connected by a suitable power transmitting chain 119 with the pickup drum 47.

During operation in the field, the implement is driven forwardly over a windrow of harvested crops, which is picked up by the upwardly moving fingers 49 and fed through the feed opening 45. The crops are scooped up by the inclined feeder plates 78 on the lower rotor and urged upwardly over the cutter bars 76. The knives 63 on the upper rotor 55, moving in the opposite direction, chop the crops into small pieces. It will be noted that with two movable cutting elements 63, 76, the tangential velocity of each of the rotors is appreciably less for the same relative speed between the two elements, than is the case with one movable and one stationary element. The comminuted material is engaged by the impeller blades 64 and forced outwardly by centrifugal force along the trailing ends 65 of the impellers, causing the chopped material to be propelled tangentially through the duct 80 and conduit 81.

I do not intend my invention to be limited to the particular details shown and described herein, except as set forth in the claims which follow.

I claim:

1. A crop treating machine comprising a mobile frame, a housing carried thereon in elevated position above the ground and having a feed opening in the bottom thereof, a pair of upper and lower rotors mounted in said housing by means providing for rotation about generally vertical axes, cooperative cutting elements on said rotors, respectively, means disposed beneath said housing for feeding crops upwardly through said feed opening, and feed members on said lower rotor for urging the crops upwardly from said feed opening to said cooperative cutting elements.

2. The combination set forth in claim 1, including the further provision that said feed members comprise axially inclined blades adapted to deflect or scoop the crops into cutting position.

3. The combination set forth in claim 1, including the further provision that said housing is provided with a discharge opening, and said upper rotor is provided with crop propelling members rotatable therewith for propelling chopped crop material through said discharge opening.

4. A crop treating machine comprising a housing having a feed opening in the bottom thereof, supporting means on said housing for carrying the latter in elevated position above the ground, pick-up mechanism disposed beneath said housing, a pair of upper and lower rotors mounted coaxially in said housing above said feed opening by means providing for rotation about a common generally vertical axis, cooperative cutting elements on said rotors, respectively, for comminuting crops fed upwardly through said opening, and feed members on said lower rotor adapted to urge crops upwardly into cutting position between said elements.

5. A crop treating machine comprising a housing having a feed opening in the bottom thereof and a discharge opening in one side, means for transporting said housing in elevated position above the ground, a pick-up device disposed beneath said housing for feeding crops upwardly into said feed opening, a pair of upper and lower rotors mounted coaxially in said housing above said opening by means providing for rotation about a generally vertical axis, means for driving said rotors in relatively opposite directions, cooperative cutting elements on said rotors, respectively, for comminuting crops therebetween, feed members on said lower rotor adapted to urge crops upwardly into cutting relation, and crop propelling blades on said upper rotor for urging the comminuted crops out through said discharge opening.

6. A crop treating machine comprising a housing having feed and discharge openings therein, a pair of rotors mounted in said housing by means providing for rotation in parallel planes, cooperative cutting elements on said rotors, respectively, for comminuting crops fed through said feed opening, one of said rotors being nearer said feed opening and having feed members comprising axially inclined blades for urging crops into cutting position between said rotors, and means for driving said rotors in relatively opposite directions.

7. A crop treating machine comprising a housing having feed and discharge openings therein, a pair of rotors mounted in said housing by means providing for rotation in parallel planes, cooperative cutting elements on said rotors, respectively, for comminuting crops fed through said feed opening, one of said rotors being nearer said feed opening and having feed members comprising axially inclined blades for urging crops into cutting position between said rotors, means for driving said rotors in relatively opposite directions, and crop propelling blades on the other of said rotors for discharging comminuted crops from said discharge opening.

8. A crop treating machine comprising a housing having feed and discharge openings therein, a pair of coaxially disposed rotors rotatably mounted in said housing adjacent said feed opening and having cooperable cutting elements for comminuting crops fed through said feed opening, one of said rotors being nearer said feed opening and having feed members comprising axially inclined blades for urging crops into cutting position between said rotors, the other of said rotors having propelling blades for discharging comminuted crops from said discharge opening, and means for driving said rotors in relatively opposite directions.

9. A crop treating machine comprising a mobile frame, a housing carried thereon and having a bottom disposed in elevated position above the ground and provided with a feed opening and further having side walls depending below the level of the bottom and spaced apart to provide a crop-receiving tunnel, a pair of coaxially disposed rotors mounted in said housing by means providing for rotation in generally horizontal planes above said feed opening, co-operable cutting elements on said rotors, respectively, means for driving said rotors in relatively opposite directions to chop crops fed through said opening, and a pick-up device mounted in said tunnel and beneath said feed opening for feeding crops upwardly through said feed opening.

JAMES RUSSELL DAY.

REFERENCES CITED

The following references are of record in the file of this patent:

UNITED STATES PATENTS

| Number | Name | Date |
|---|---|---|
| 891,299 | Smith et al. | June 23, 1908 |
| 1,585,243 | Handsmann | May 18, 1926 |
| 2,105,803 | Barnes | Jan. 18, 1938 |
| 2,160,275 | Magee et al. | May 30, 1939 |
| 2,349,386 | Stoetzl et al. | May 23, 1944 |